United States Patent
Shim

(10) Patent No.: US 10,327,271 B2
(45) Date of Patent: Jun. 18, 2019

(54) ELECTRONIC APPARATUS AND CONTROLLING METHOD THEREOF

(71) Applicant: SAMSUNG ELECTRONICS CO., LTD., Suwon-si (KR)

(72) Inventor: Seung-seop Shim, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 29 days.

(21) Appl. No.: 15/807,052

(22) Filed: Nov. 8, 2017

(65) Prior Publication Data
US 2018/0132286 A1 May 10, 2018

(30) Foreign Application Priority Data
Nov. 8, 2016 (KR) ........................ 10-2016-0148392

(51) Int. Cl.
*H04W 4/00* (2018.01)
*H04W 76/11* (2018.01)
(Continued)

(52) U.S. Cl.
CPC ............. *H04W 76/11* (2018.02); *G08C 23/02* (2013.01); *G10K 11/178* (2013.01); *H04B 11/00* (2013.01);
(Continued)

(58) Field of Classification Search
CPC ..... H04W 76/11; H04W 76/10; H04W 8/005; H04W 4/80; H04W 12/06; H04L 67/34;
(Continued)

(56) References Cited

U.S. PATENT DOCUMENTS 8,649,526 B2 2/2014 Vernon
9,276,541 B1 3/2016 Froment et al.
(Continued)

FOREIGN PATENT DOCUMENTS

EP 2723005 A1 4/2014
JP 2006237783 A 9/2006
(Continued)

OTHER PUBLICATIONS

Communication dated Feb. 21, 2018, issued by the European Patent Office in counterpart European Patent Application No. 17198710.0.
(Continued)

*Primary Examiner* — Marcos Batista
(74) *Attorney, Agent, or Firm* — Sughrue Mion, PLLC

(57) ABSTRACT

An electronic apparatus is provided. The electronic apparatus comprises a speaker; a microphone; a communicator configured to communicate with an external electronic apparatus; and a processor configured to: activate the microphone in response to receiving information indicating that the external electronic apparatus is in an initial setting state through the communicator, the information being broadcasted by the external electronic apparatus via a first wireless communication method, in response to receiving a sound output by the external electronic apparatus through the microphone, generate an inverted sound by inverting a phase of the received sound, output the inverted sound through the speaker such that the sound output by the external electronic apparatus is offset by the inverted sound, and obtain address information of the external electronic apparatus for wireless communication with the external electronic apparatus from the sound received through the microphone.

20 Claims, 7 Drawing Sheets

(51) Int. Cl.
*H04W 12/06* (2009.01)
*G10K 11/178* (2006.01)
*H04R 3/00* (2006.01)
*H04R 1/04* (2006.01)
*H04W 4/80* (2018.01)
*H04L 29/08* (2006.01)
*G08C 23/02* (2006.01)
*H04B 11/00* (2006.01)
*H04W 8/00* (2009.01)
*H04W 76/10* (2018.01)

(52) U.S. Cl.
CPC .............. *H04L 67/34* (2013.01); *H04R 1/04* (2013.01); *H04R 3/00* (2013.01); *H04W 4/80* (2018.02); *H04W 8/005* (2013.01); *H04W 12/06* (2013.01); *H04W 76/10* (2018.02); *G10K 2210/108* (2013.01); *G10K 2210/3044* (2013.01); *H04R 2499/11* (2013.01)

(58) Field of Classification Search
CPC .......... H04B 11/00; G08C 23/02; H04R 1/04; H04R 3/00; H04R 2499/11; G10K 11/178; G10K 2210/108; G10K 2210/3044

USPC .......................................... 370/328; 455/411
See application file for complete search history.

(56) References Cited

U.S. PATENT DOCUMENTS 9,462,370 B2   10/2016  Sato
2014/0087709 A1* 3/2014  Nielsen .................. H04W 4/50
                                                      455/418
2016/0198342 A1   7/2016  Kim et al.

FOREIGN PATENT DOCUMENTS

| JP | 2013118636 A1 | 5/2015 |
| KR | 101465903 B1 | 11/2014 |
| KR | 101514150 B1 | 4/2015 |
| KR | 1020160089582 A | 7/2016 |

OTHER PUBLICATIONS

Communication dated Jul. 11, 2018, issued by the European Patent Office in counterpart European Application No. 17198710.0.

* cited by examiner

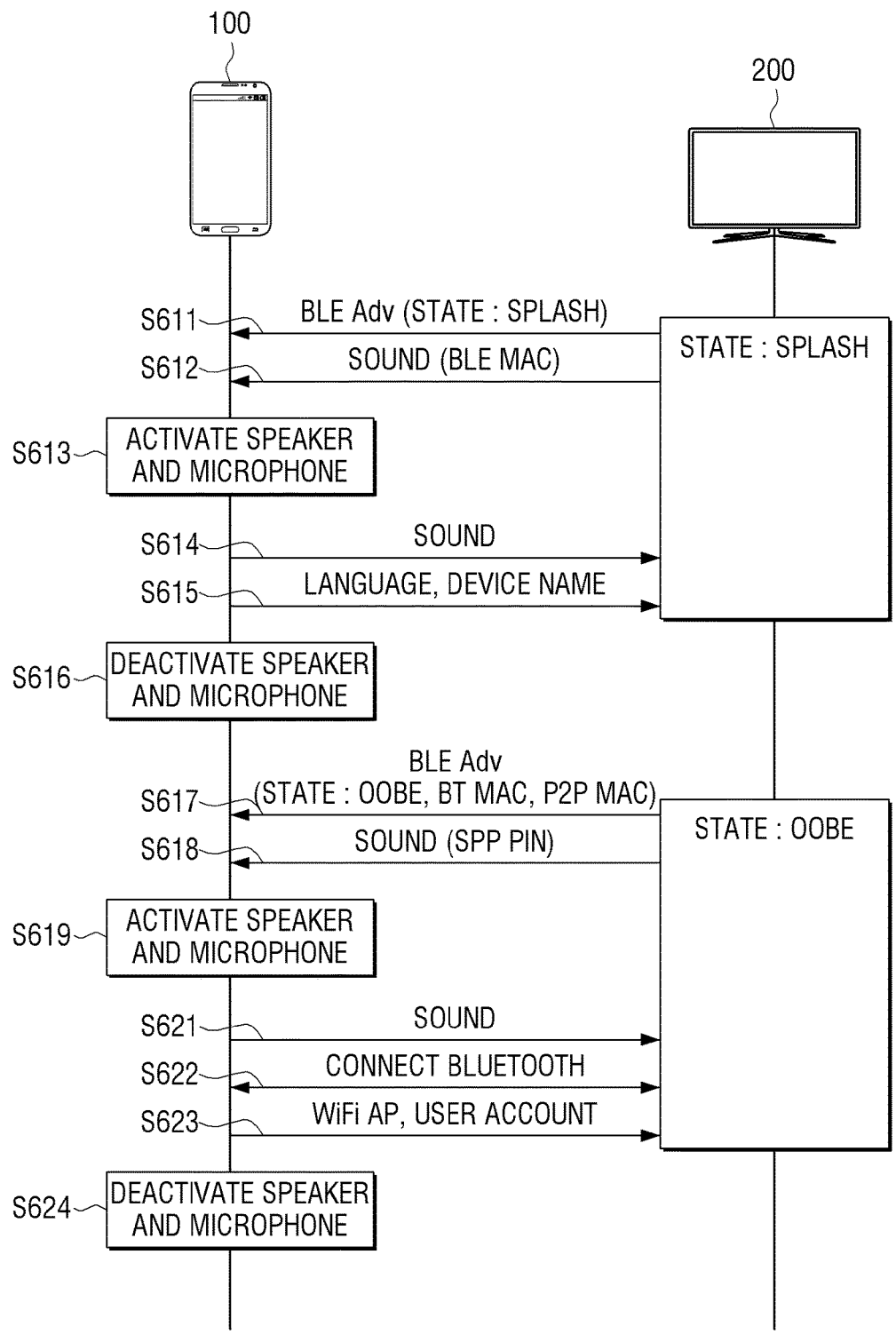

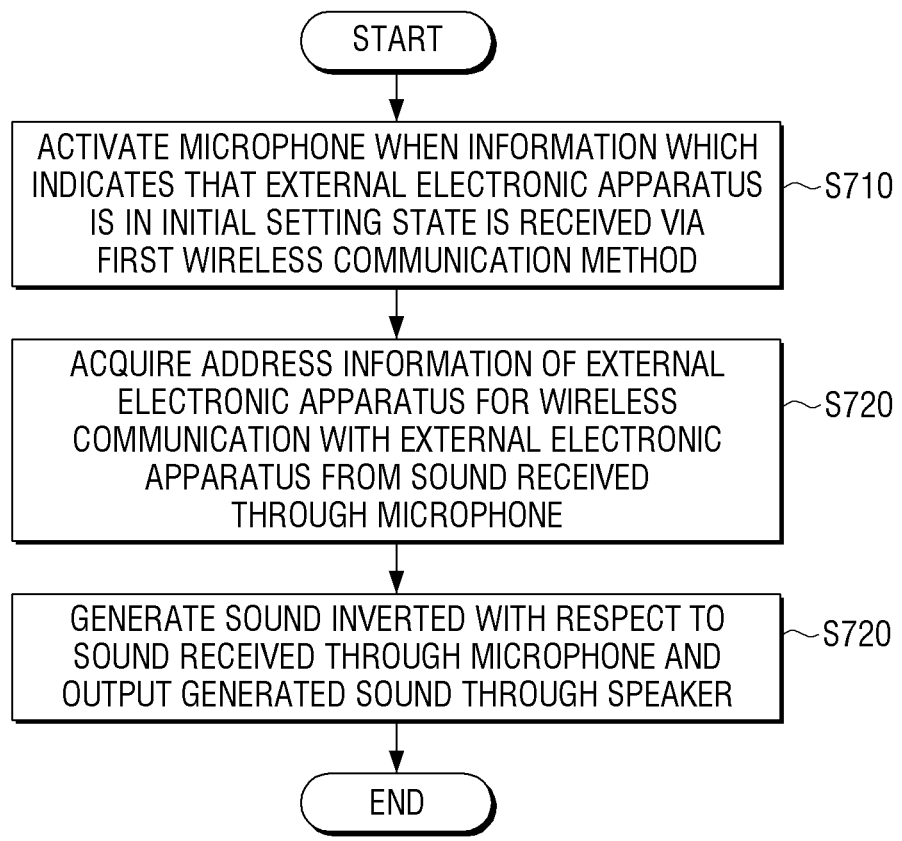

ELECTRONIC APPARATUS AND CONTROLLING METHOD THEREOF

CROSS-REFERENCE TO RELATED APPLICATIONS

This application claims priority from Korean Patent Application No. 10-2016-0148392, filed on Nov. 8, 2016 in the Korean Intellectual Property Office, the disclosure of which is incorporated herein by reference in its entirety.

BACKGROUND

Field

Apparatuses and methods consistent with exemplary embodiments relate to an electronic apparatus and a controlling method thereof, and more particularly, to an electronic apparatus which performs a registration process of an external electronic apparatus through a communication with the external electronic apparatus, and the controlling method thereof.

Description of the Related Art

In general, a user of an electronic apparatus has to manually perform a registration process with respect to an electronic apparatus to configure settings of the electronic apparatus.

For example, in order to connect the electronic apparatus to a network (e.g., a Wi-Fi network), a user is required to register network information (e.g., information regarding a Wi-Fi access point (AP) such as identification information and address information of the Wi-Fi AP) with the electronic apparatus. Also, in order to receive a service through the electronic apparatus (e.g., an application download), a user is required to register, i.e., input, user account information (e.g., user name and password) so that the user may log in a web server providing the corresponding service to the electronic apparatus.

Accordingly, a task of configuring settings of the electronic device may be inconvenient to a user, particularly to those who are not familiar with registering setting information with the electronic device.

SUMMARY OF THE INVENTION

One or more exemplary embodiment address the problem described above and provide an electronic apparatus which processes the registration process of an external electronic apparatus by using the electronic apparatus which already has setting information, and capable of removing a noise which can occur in the registration process, and the controlling method thereof.

According to an aspect of an exemplary embodiment, there is provided an electronic apparatus including: a speaker; a microphone; a communicator configured to communicate with an external electronic apparatus; and a processor configured to: activate the microphone in response to receiving information indicating that the external electronic apparatus is in an initial setting state through the communicator, the information being broadcasted by the external electronic apparatus via a first wireless communication method, in response to receiving a sound output by the external electronic device through the microphone, generate an inverted sound by inverting a phase of the received sound, output the inverted sound through the speaker such that the sound output by the external electronic device is offset by the inverted sound, and obtain address information of the external electronic apparatus for wireless communication with the external electronic apparatus from the sound received through the microphone.

The address information of the external electronic apparatus may be address information of the external electronic apparatus according to the first wireless communication method.

The processor may be further configured to control the communicator to transmit information regarding language setting of the electronic apparatus to the external electronic apparatus by using the address information of the external electronic apparatus.

The first wireless communication method may be a Bluetooth Low Energy (BLE) communication method, wherein the address information of the external electronic apparatus includes a BLE Media Access Control (MAC) address, and wherein the information indicating that the external electronic apparatus is in the initial setting state is transmitted to the electronic apparatus through a BLE advertising packet.

The processor may be further configured to: in response to receiving, via the first wireless communication method, information indicating that the external electronic apparatus is in a network setting state and address information of the external electronic apparatus according to the second wireless communication method through the communicator, activate the microphone, in response to receiving another sound from the external electronic apparatus through the microphone, generate another inverted sound by inverting a phase of the other sound received from the external electronic apparatus, output the other inverted sound through the speaker such that the other sound received from the external electronic apparatus is offset by the other inverted sound, and obtain authentication information, which is required for establishing a communication link with the external electronic apparatus according to a second wireless communication, from the other sound received from the external electronic apparatus.

The second wireless communication method may be a Bluetooth communication method.

The processor may be further configured to control the communicator to establish the communication link with the external electronic apparatus according to the second wireless communication method by using the authentication information and the address information of the external electronic apparatus according to the second wireless communication method.

The processor may be further configured to control the communicator to transmit information regarding a network to which the electronic apparatus is connected to and user account information of the electronic apparatus to the external electronic apparatus through the communication link.

The information regarding the network may include identification information and address information of a Wi-Fi Access Point.

The processor may be further configured to deactivate the speaker and the microphone after transmitting the information regarding the network and the user account information to the external electronic apparatus.

The second wireless communication method may be a Bluetooth communication method, wherein the address information of the external electronic apparatus according to the second wireless communication method includes a Media Access Control (MAC) address, wherein the authentication information includes a Bluetooth Serial Port Protocol (SPP) personal identification number (PIN), and wherein the processor is further configured to receive the information indicating that the external electronic apparatus is in the network setting state and the address information of the external electronic apparatus according to the second wireless communication method through a BLE advertising packet.

According to another aspect of an exemplary embodiment, there is provided a method for controlling an electronic apparatus to register setting information with an external electronic apparatus, including: activating a microphone of the electronic device in response to receiving information indicating that the external electronic apparatus is in an initial setting state via a first wireless communication method; in response to receiving a sound output by the external electronic apparatus through the microphone, generating an inverted sound by inverting a phase of the received sound; outputting the inverted sound through a speaker of the electronic device such that the sound output by the external electronic device is offset by the inverted sound; and obtaining address information of the external electronic apparatus for wireless communication with the external electronic apparatus from the received sound.

The address information of the external electronic apparatus may be address information of the external electronic apparatus according to the first wireless communication method.

The method may further include transmitting information regarding language setting of the electronic apparatus to the external electronic apparatus by using the address information of the external electronic apparatus.

The first wireless communication method may be a Bluetooth Low Energy (BLE) communication method, wherein the address information of the external electronic apparatus includes a BLE Media Access Control (MAC) address, and wherein the information indicating that the external electronic apparatus is in the initial setting state is transmitted to the electronic apparatus through a BLE advertising packet.

The method may further include: activating the microphone in response to receiving, through the first wireless communication method, information indicating that the external electronic apparatus is in a network setting state and the address information of the external electronic apparatus according to a second wireless communication method; in response to receiving another sound from the external electronic apparatus through the microphone; generating another inverted sound by inverting a phase of the other sound received from the external electronic apparatus; outputting the other inverted sound through the speaker such that the other sound received from the external electronic apparatus is offset by the other inverted sound; and obtaining authentication information, which is required for establishing a communication link with the external electronic apparatus according to a second wireless communication, from the other sound received from the external electronic apparatus.

The second wireless communication method may be a Bluetooth communication method.

The method may further include establishing the communication link with the external electronic apparatus according to the second wireless communication method by using the authentication information and the address information of the external electronic apparatus according to the second wireless communication method.

The method may further include transmitting information regarding a network to which the electronic apparatus is connected to and user account information of the electronic apparatus to the external electronic apparatus through the communication link.

The second wireless communication method may be a Bluetooth communication method, wherein the address information of the external electronic apparatus according to the second wireless communication method includes a Media Access Control (MAC) address, wherein the authentication information includes a Bluetooth Serial Port Protocol (SPP) personal identification number (PIN), and wherein the information indicating that the external electronic apparatus is in the network setting state and the address information of the external electronic apparatus according to the second wireless communication method are transmitted to the electronic apparatus through a BLE advertising packet.

BRIEF DESCRIPTION OF THE DRAWINGS

The above and/or other aspects will become apparent and more readily appreciated from the following description of exemplary embodiments, taken in conjunction with the accompanying drawings, in which:

FIG. 6 is a flow diagram illustrating a setting method according to an exemplary embodiment; and FIG. 7 is a flow chart illustrating a method for controlling an electronic apparatus to register setting information with an external electronic apparatus, according to an exemplary embodiment.

DETAILED DESCRIPTION OF EXEMPLARY EMBODIMENTS

Hereinafter, the exemplary embodiments will be explained in detail with reference to the accompanying drawings.

Terms used in the present disclosure are selected as general terminologies currently widely used in consideration of the configuration and functions of the present disclosure, but can be different depending on intention of those skilled in the art, a precedent, appearance of new technologies, and the like. In addition, in a special case, terms selected by the applicant may be used. In this case, the meaning of the terms will be explained in detail in the corresponding detailed descriptions. Accordingly, the terms used in the description should not necessarily be construed as simple names of the terms, but be defined based on meanings of the terms and overall contents of the present disclosure.

Further, when a certain portion is stated as "comprising" or "including" a certain element, unless otherwise stated, this means that the certain portion may include another element, rather than foreclosing the same. Further, in the present disclosure, a 'module' or a 'unit' means a unit which performs at least one function or operation and may be implemented by hardware or software or a combination of hardware and software, for example, a hardware processor executing software.

The example embodiments of the disclosure will be described in greater detail below in a manner that will be understood by one of ordinary skill in the art. However, exemplary embodiments may be realized in a variety of different configurations, and not limited to descriptions provided herein. Also, well-known functions or constructions are not described in detail since they would obscure the inventive concepts with unnecessary detail.

Figure 1:
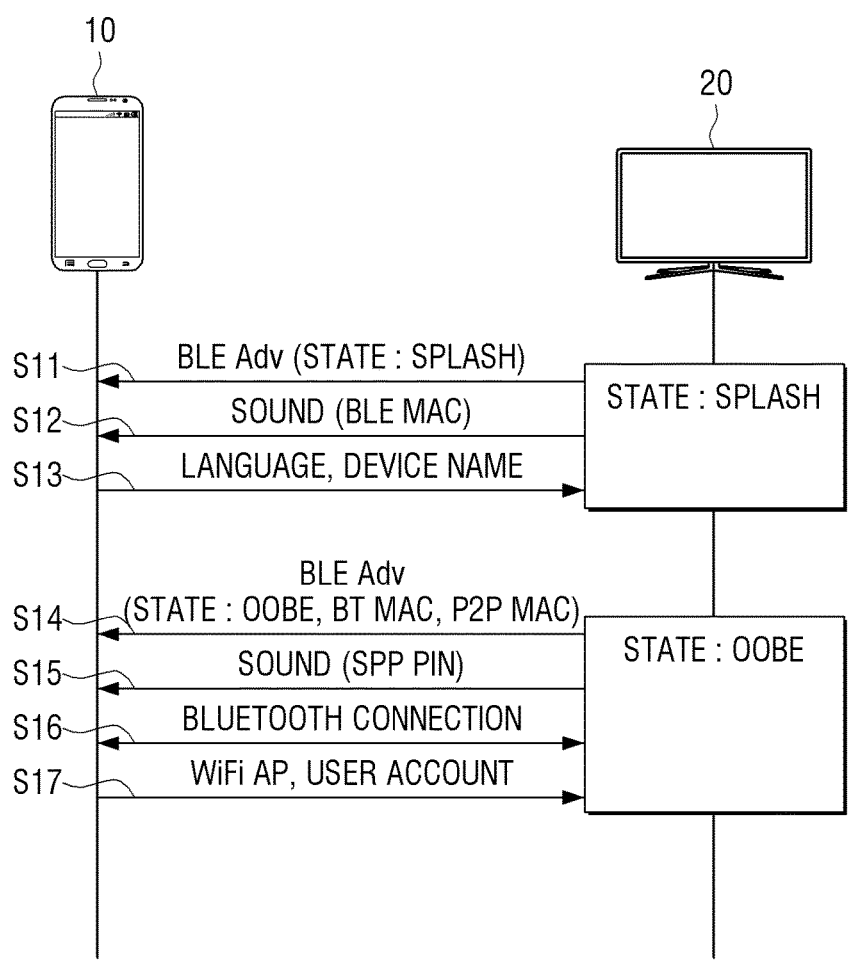
FIG. 1 is a flow diagram illustrating a method for registering various information with an electronic apparatus by using another electronic apparatus which has registration information.

FIG. 1 is a flow diagram illustrating a method for registering various setting information with an electronic apparatus by using registration information of another electronic apparatus.

As shown in FIG. 1, a registration process for a television (TV) 20 is performed by using a terminal apparatus 10 (e.g., a smart phone) which already has the information regarding a Wi-Fi access point and user account information.

Referring to FIG. 1, in an initial booting of the TV 20 (that is, when a user turns on the TV 20 for the first time purchasing the TV 20), the TV 20 may perform an initial setting stage in which settings for the TV 20, e.g., a language, is configured.

Here, in the initial setting stage, the TV 20 may output a specific image and a sound for a predetermined time. For example, the TV 20 may output a splash image and the sound thereof for six to seven seconds and then, output a welcome mode image and the sound thereof for four to five seconds. Hereinafter, the state in which the initial setting stage is performed according to the initial booting will be referred to as a splash state.

In operation S11, on entering the splash stage, the TV 20 broadcasts a Bluetooth Low Energy (BLE) advertising packet which comprises state information indicating that the TV 20 is in the splash state through a BLE communication method.

In operation S11, according to a sound communication (an acoustic communication), the TV 20 outputs a sound comprising a BLE address (a BLE media access control (MAC) address) of the TV 20.

As a result, the terminal apparatus 10 may receive the BLE advertising packet broadcasted by the TV 20 and the sound output by the TV 20, and determines that the TV 20 is in an initial setting stage based on the state information of the TV 20 included in the BLE advertising packet.

In operation S13, the terminal apparatus 10 transmits information regarding a language setting and a device name of the terminal apparatus 10 to the TV 20 through a BLE communication, using the BLE address included in the sound received from the TV 20 in S13.

Accordingly, in the initial setting stage, the TV 20 may set a language of the TV 20 as the same language with the terminal apparatus 10 based on the language information received from the terminal apparatus 10. For example, if the language of the terminal apparatus 10 is set as Korean, the language of the TV may be set as Korean as well based on the language information received from the terminal apparatus 10.

Thereafter, the TV 20 may enter an out of box experience (OOBE) state in which a network setting stage is performed. Here, the network setting stage may comprise a Wi-Fi network setting for a connection with the Wi-Fi network, a user account setting to access a web server, and the like.

In operation S14, the TV 20 enters the OOBE state, and broadcasts the BLE advertising packet which comprises state information indicating that the TV 20 is in the OOBE state, a Bluetooth address (Bluetooth (BT) MAC address) and a peer-to-peer (P2P) address (P2P MAC address) through a BLE communication.

In operation S15, the TV 20 outputs a sound comprising a Serial Port Protocol (SPP) personal identification number (PIN) for a Bluetooth authentication according to a sound communication. Accordingly, the terminal apparatus 10 may receive the BLE advertising packet broadcasted by the TV 20 and the sound output by the TV 20.

At this time, the terminal apparatus 10 determines that the TV 20 is in the OOBE state by using the state information of the TV 20 included in the BLE advertising packet broadcasted by the TV 20.

In operation S16, the terminal apparatus 10 may be connected to the TV 20 according to a Bluetooth communication method by using the SPP PIN included in the sound received from the TV 20. Specifically, the terminal apparatus 10 and the TV 20 may perform a Bluetooth SPP communication by establishing a communication link.

In other words, the terminal apparatus 10 requests a communication connection according to the Bluetooth method to the TV 20, and if the communication connection request according to the Bluetooth method is received from the terminal apparatus 10, the TV 20 may establish a communication link with the terminal apparatus 10 according to the Bluetooth communication method.

Herein, the communication connection request may comprise a pairing request. The pairing means the process of confirming a designated password, identification information and/or authentication information for a mutual communication connection between the apparatuses supporting a Bluetooth function.

In operation S17, if the terminal apparatus 10 is connected to the TV 20, the terminal apparatus 10 transmits information regarding a Wi-Fi access point and/or user account information to the TV.

Accordingly, the TV 20 sets the information regarding the Wi-Fi access point received from the terminal apparatus 10 as the network information to access the network in the TV 20, and sets the user account information received from the terminal apparatus 10 as the user account information to log in a web server in the TV 20.

In the method illustrated in FIG. 1, the TV 20 transmits the BLE address and the SPP PIN information to the terminal apparatus 10 through a sound.

In general, such a sound has high frequency components in the audible frequency band (i.e., 20 Hz~20 kHz) and some high frequency component may have a frequency near 20 kHz according to circumstances. As a result, the sound may be a noise to a pet or a person, particularly to those having an audible frequency range (e.g., a child).

Figure 2:
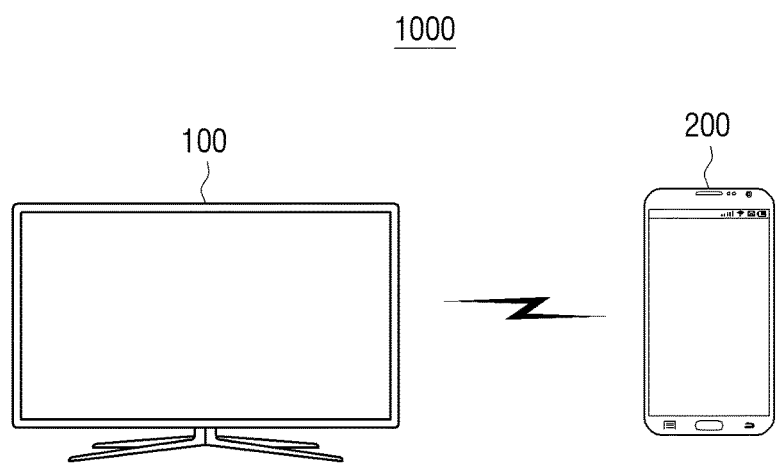
FIG. 2 is a view illustrating a system which supports a setting according to an exemplary embodiment.

FIG. 2 is a view illustrating a system which supports a setting according to an exemplary embodiment.

Referring to FIG. 2, the system 1000 comprises an electronic apparatus 100 and an external electronic apparatus 200.

As illustrated in FIG. 2, the electronic apparatus 100 may be implemented as a smartphone, and the external electronic apparatus 200 may be implemented as a TV.

However, examples of the electronic apparatus 100 and the electronic apparatus 100 are not limited thereto. For example, the electronic apparatus 100 may be implemented as a tablet personal computer (PC), a wearable device, a note book and the like, and the external electronic apparatus 200 may be implemented as a set top box, a projector and the like.

The electronic apparatus 100 and the external electronic apparatus 200 may respectively perform operations performed by the terminal apparatus 10 and the TV 20 illustrated in FIG. 1. That is, the external electronic apparatus 200 may perform an initial setting stage and a network setting stage by using language information, network information and user account information received from the electronic apparatus 100.

However, the electronic apparatus 100 may perform additional operations which were not performed by the terminal apparatus 10 in FIG. 1.

Specifically, if the sound output from the external electronic apparatus 200 is received, the electronic apparatus 100 may invert the phase of the received sound and output the sound of which the phase is inverted. Accordingly, the sound output from the external electronic apparatus 200 may be offset by the sound output from the electronic apparatus 100, thereby preventing the sound output from the external electronic apparatus 200 being recognized as a noise to a pet or a person.

Figure 3:
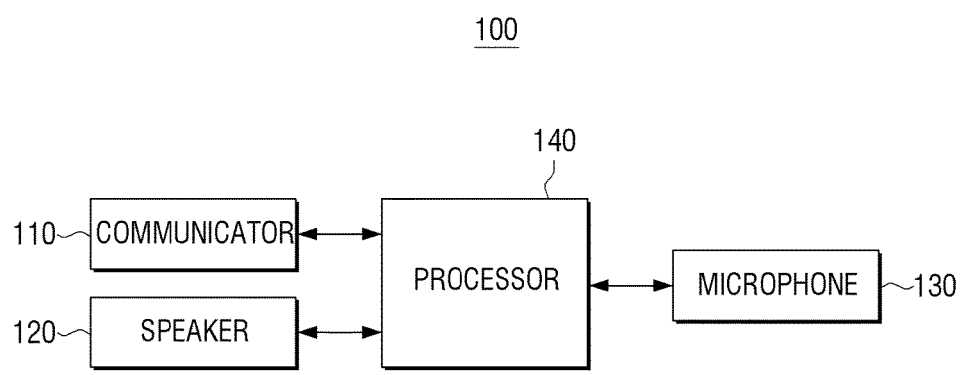
FIG. 3 is a block diagram illustrating composition of an electronic apparatus according to an exemplary embodiment.

FIG. 3 is a block diagram illustrating composition of an electronic apparatus according to an exemplary embodiment.

Referring to FIG. 3, the electronic apparatus 100 may comprise a communicator 110, a speaker 120, a microphone 130 and a processor 140. However, the configuration illustrated in FIG. 3 is merely an exemplary embodiment, and new components may be added according to an exemplary embodiment. Also, one or more components of the electronic apparatus 100 in FIG. 3 may be omitted according to an exemplary embodiment.

The communicator 110 may include transceiver that performs a communication with the external electronic apparatus 200. Specifically, the communicator 110 may perform a communication with the external electronic apparatus 200 by using a first wireless communication method. The first wireless communication method may be a BLE communication method, but is not limited thereto. The communicator 110 may comprise a communication module which may perform a communication according to the BLE communication standard.

In addition, the communicator 110 may communicate with the external electronic apparatus 200 by using a second wireless communication method. The second wireless communication method may be a Bluetooth communication method, but is not limited thereto. The communicator 110 may comprise a communication module which may perform a communication according to a Bluetooth communication standard.

The speaker 120 may output a sound. For example, the speaker 120 may output a sound in the audible frequency range.

The microphone 130 may receive an external sound. For example, the microphone 130 may receive a sound in the audible frequency range.

The microphone 130 may receive the sound from the external electronic apparatus 200, and the sound may include information required for communication between the electronic apparatus 100 and the external electronic apparatus 200.

The processor 140 may control an overall operation of the electronic apparatus 100. If the sound including the information required for a communication between with the electronic apparatus 100 and the external electronic apparatus 200 is received from the external electronic apparatus 200, the processor 140 may invert the phase of the received sound and output the sound of which the phase is inverted through the speaker 120.

Accordingly, the sound output from the external electronic apparatus 200 may be offset by the sound output from the speaker 120, thereby canceling an audible noise cause by the sound output from the external electronic apparatus 200. This process will be explained below in more detail.

First, the processor 140 may activate (or turn on) the communicator 110. Specifically, the processor 140 may activate a communication module to the state that a communication may be performed according to the first wireless communication method, and activate the communication module to the state that the communication may be performed according to the second wireless communication method.

The external electronic apparatus 200 may perform an initial setting stage according to the initial booting process. That is, the external electronic apparatus 200 may send information indicating that the external electronic apparatus 200 is in an initial setting state (i.e., splash state) through the first wireless communication method. Specifically, the external electronic apparatus 200 may broadcast a BLE advertising packet in which the information indicating that the external electronic apparatus 200 is in an initial setting state through the BLE communication method.

At this point, the communicator 110 may be in an activated state. Accordingly, the communicator 110 may receive the information which indicates that the external electronic apparatus 200 is in an initial setting state through the first wireless communication method.

If the information that the external electronic apparatus 200 is in an initial setting state is received by the communicator 110 through the first wireless communication method, the processor 140 may control the microphone 130 to be activated.

Thereafter, the microphone 130 may receive a sound comprising the address information of the external electronic apparatus 200, which is used for a wireless communication with the external electronic apparatus 200.

Here, the address information of the external electronic apparatus 200 may be the address information according to the first wireless communication method. For example, the address information of the external electronic apparatus may comprise a BLE address of the external electronic apparatus 200 according to a BLE communication method.

That is, when broadcasting the BLE advertising packet including the information indicating an initial setting state, the external electronic apparatus 200 may output a sound carrying the BLE address of the external electronic apparatus 200 through a speaker of the external electronic apparatus 200.

The external electronic apparatus 200 may output the sound including its own BLE address simultaneously with the BLE advertising packet including information indicating the initial setting state. Here, the external electronic apparatus 200 may output the BLE advertising packet and the sound repeatedly for preset times.

Accordingly, if the BLE advertising packet is received, the processor 140 may determine that the external electronic apparatus 200 is in the initial setting state based on the state information of the external electronic apparatus 200 included in the BLE advertising packet. Then, the processor 140 may activate the microphone 130 and receive the sound including the BLE address of the external electronic apparatus 200 output by the external electronic apparatus 200.

The processor 140 may obtain the BLE address of the external electronic apparatus 200 from the received sound and output the address information of the external electronic apparatus 200.

When the external electronic apparatus 200 outputs the sound including the BLE address, another sound (a background sound output by the external electronic apparatus 200 in the initial setting state, for example, the sound regarding the splash image) may be also output. Thus, the microphone 130 may receive another sound together with the sound including the BLE address of the external electronic apparatus 200.

Accordingly, the processor 140 may filter and remove the sounds other than the sound including the BLE address from the sound received through the microphone 130.

Specifically, the external electronic apparatus 200 may generate the sound including the BLE address of the external electronic apparatus 200 by modulating the BLE address according to a predetermined modulation/demodulation scheme known to the electronic apparatus 100, and output the generated sound through a speaker included in the external electronic apparatus 200.

Accordingly, the processor 140 of the electronic apparatus 100 may obtain the BLE address of the external electronic apparatus 200 by demodulating the received sound and extracting only the sound including the BLE address of the external electronic apparatus 200 from the received sound.

The processor 140 may invert the phase of the received sound, activate the speaker 120, and output the sound. That is, the processor 140 may generate the inverted sound by inverting the phase of the received sound and output the generated sound through the speaker 120.

Specifically, if the BLE advertising packet is received, the processor 140 may determine whether the external electronic apparatus 200 is in an initial setting state based on the state information included in the BLE advertising packet, and if the external electronic apparatus 200 is in the initial setting state, the processor 140 may activate the speaker 120.

In addition, the processor 140 may demodulate the sound received through the microphone 130, obtain the sound including the BLE address of the external electronic apparatus 200, invert the phase of the obtained sound, and output the sound of which the phase is inverted (hereinafter "first inverted sound") through the speaker 120.

In this case, the processor 140 may amplify the first inverted sound through an amplifier to have the same intensity as the intensity of the received sound.

In addition, if the sound is received, the processor 140 may immediately output the first inverted sound. That is, on receiving the sound, the processor 140 may generate and output the first inverted sound immediately such that the sounds (i.e., the received sound and the first inverted sound) may output from the external electronic apparatus 200 and from the electronic apparatus 100 almost simultaneously.

Upon receiving the sound output from the external electronic apparatus 200 through the microphone 130, the processor 140 may deactivate (or turn off) the microphone 130. However, according to an exemplary embodiment, the processor 140 may maintain the activated state of the microphone 130 even after the sound is received.

In addition, if the first inverted sound is output through the speaker 120, the processor 140 may deactivate the speaker 120. However, according to an exemplary embodiment, the processor 140 may maintain the activated state of the speaker 120 even after the first inverted sound is output.

The processor 140 may control the communicator 110 to transmit the information regarding the language setting of the electronic apparatus 100 to the external electronic apparatus 200 by using the address information of the external electronic apparatus 200 included in the received sound.

Specifically, the processor 140 may control the communicator 110 to transmit the information regarding the language setting of the electronic apparatus 100 to the external electronic apparatus 200 according to the BLE communication method by using the BLE address of the external electronic apparatus 200. In addition, the processor 140 may control the communicator 110 to transmit the name of the electronic apparatus 100 to the external electronic apparatus 200 according to the BLE communication method by using the BLE address of the external electronic apparatus 200.

Accordingly, the external electronic apparatus 200 may set the language of the external electronic apparatus 200 by using the information regarding the language setting received from the electronic apparatus 100.

Specifically, the external electronic apparatus 200 may set the language of the external electronic apparatus 200 as the same language as set in the electronic apparatus 100 based on the information regarding the language setting received from the electronic apparatus 100.

As a result, the external electronic apparatus 200 may set the language of the external electronic apparatus 200 during the initial setting stage according to the above described process.

After the initial setting stage, the external electronic apparatus 200 enters a network setting stage.

First, the external electronic apparatus 200 may transmit, using the first wireless communication method, information indicating that the external electronic apparatus 200 is in a network setting state (that is, an OOBE state) and the address information of the external electronic apparatus 200 that is required for the second wireless communication method.

Here, the second wireless communication method may be a Bluetooth communication method, and the address information of the external electronic apparatus 200 according to the second wireless communication method may include a Bluetooth address and/or a P2P address.

Specifically, the external electronic apparatus 200 may broadcast the BLE advertising packet, by using the BLE communication method. The BLE advertising packet may include information indicating that the external electronic apparatus 200 is in the network setting state, and address information (i.e., the Bluetooth address and the P2P address) of the external electronic apparatus 200.

At this time, the communicator 110 may be in an activated state. Accordingly, the communicator 110 may receive, via the first wireless communication method, the information indicating that the external electronic apparatus 200 is in the network setting state and the address information of the external electronic apparatus 200 according to the second wireless communication method.

After receiving, through the first wireless communication method, the information indicating that the external electronic apparatus 200 is in the network setting state and the address information of the external electronic apparatus 200 according to the second wireless communication method, the processor 140 may activate the microphone 130.

Thereafter, the microphone 130 may receive the sound including the authentication information for the second wireless communication method with the external electronic apparatus 200. For example, the authentication information for the wireless communication may comprise the Bluetooth SPP PIN.

That is, when broadcasting the information which indicates a network setting state and the BLE advertising packet including the Bluetooth address, the external electronic apparatus 200 may output the sound including the SPP PIN for a Bluetooth authentication through a speaker included in the external electronic apparatus 200.

In this case, when outputting the information which indicates the network setting state and the BLE advertising packet including the Bluetooth address, the external electronic apparatus 200 may concurrently output the sound including the SPP PIN. Here, the external electronic apparatus 200 outputs the BLE advertising packet together with the sound repeatedly for the preset number of times.

Accordingly, if the BLE advertising packet is received, the processor 140 determines that the external electronic apparatus 200 is in the network setting state based on the state information of the external electronic apparatus 200 included in the BLE advertising packet, and if the external electronic apparatus 200 is in the network setting state, the processor 140 may activate the microphone 130 and receive the sound including the SPP PIN output by the external electronic apparatus 200.

The processor 140 may obtain the authentication information for the wireless communication with the external electronic apparatus 200 from the sound received through the microphone 130. That is, the processor 140 may obtain the SPP PIN information from the received sound.

In this case, in that when outputting the sound including the SPP PIN, the external electronic apparatus 200 also outputs another sound (a background sound output by the external electronic apparatus 200 at the network setting stage), the microphone 130 receives these sounds together.

Accordingly, the processor 140 may filter and remove the sounds other than the sound including the SPP PIN from the sounds received through the microphone 130.

Specifically, the external electronic apparatus 200 may modulate the SPP PIN according to the method predetermined between the electronic apparatus 100, generate the sound for a sound communication, and output the generated sound through the speaker included in the external electronic apparatus 200.

Accordingly, the processor 140 may obtain the SPP PIN by demodulating the sound received through the microphone 130 in the method predetermined between the external electronic apparatus 200 according to the sound communication and by obtaining only the sound which comprises the SPP PIN from the sound received through the microphone 130.

The processor may activate the speaker 120, invert the phase of the received sound and output the sound. That is, the processor 140 may generate the inverted sound in which the received sound is inverted and output the generated sound through the speaker 120.

Specifically, if the BLE advertising packet is receive, the processor 140 may determine that the external electronic apparatus 200 is in a network setting state based on the state information of the external electronic apparatus 200 included in the BLE advertising packet, and activate the speaker 120 if the external electronic apparatus 200 is in the network setting state.

In addition, the processor 140 may obtain the sound including the SPP PIN by demodulating the sound received through the microphone 130, invert the phase of the sound including the SPP PIN, and output the sound of which the phase is inverted (hereinafter "second inverted sound") through the speaker 120.

In this case, in order to output the second inverted sound in the same intensity as the intensity of the received sound, the processor 140 may amplify and output the inverted sound through an amplifier.

If a sound is received, the processor 140 may immediately output the second inverted sound. That is, if the sound is received, the processor 140 may generate and output the second inverted sound through the speaker 120. Accordingly, the sounds (i.e., the received sound and the second inverted sound) may output from the external electronic apparatus 200 and from the electronic apparatus 100 almost simultaneously.

The processor 140 may control the communicator 110 to establish a communication link with the external electronic apparatus 200 according to the second wireless communication method by using the address information of the external electronic apparatus and the authentication information according to the second wireless communication method.

That is, the communicator 110 may request a Bluetooth connection by transmitting the SPP PIN to the external electronic apparatus 200 based on the address information included in the BLE advertising packet. Here, the communication connection request may comprise a pairing request.

The external electronic apparatus 200 may compare the SPP PIN with the preset SPP PIN. If the two SPP PINs are identical, the external electronic apparatus 200 may transmit an answer message in response to the connection request to the electronic apparatus 100 such that the electronic apparatus 100 and the external electronic apparatus 200 may form the communication link according to a Bluetooth communication link.

The processor 140 may control the communicator 110 to transmit the information regarding the network to which the electronic apparatus 100 is connected to and the user account information of the electronic apparatus 100 to the external electronic apparatus 200 through the Bluetooth communication link.

Specifically, the processor 140 may control the communicator 110 to transmit the information regarding the Wi-Fi access point, which is used by the electronic apparatus 100 for a Wi-Fi network connection, and the user account information to log in a web server which provides a service to the external electronic apparatus 200, according to the Bluetooth communication link formed between the electronic apparatus 100 and the external electronic apparatus 200.

Accordingly, the external electronic apparatus 200 may connect to the same Wi-Fi access point to which the electronic apparatus 100 is connected to. Also, the external electronic apparatus 200 may log in a web server using the user account stored in the electronic apparatus 100.

As a result, the external electronic apparatus 200 may register the network and the user account of the external electronic apparatus 200 during the network setting stage in a fast and easy way according to the above described process.

Figure 4:
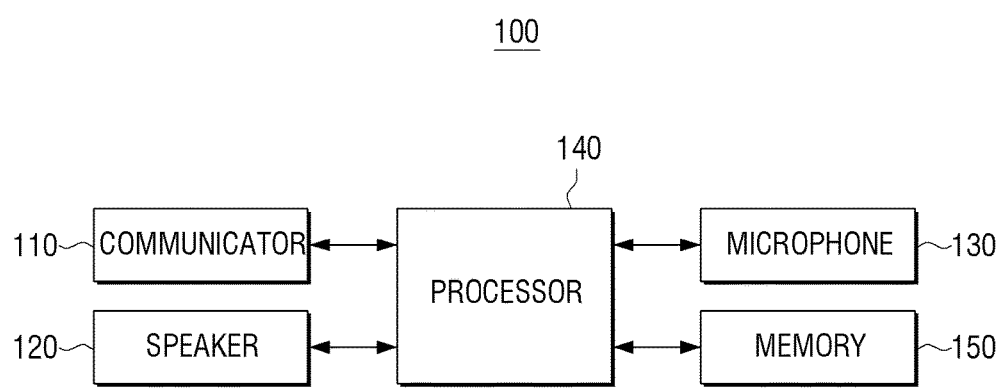
FIG. 4 is a block diagram illustrating composition of an electronic apparatus according to another exemplary embodiment.

FIG. 4 is a block diagram illustrating composition of an electronic apparatus according to another exemplary embodiment.

As illustrated in FIG. 4, the electronic apparatus 100 may comprise the communicator 110, the speaker 120, the microphone 130, the processor 140 and a memory 150. However, the configuration illustrated in FIG. 4 is merely an exemplary embodiment, and new elements may be added according to an exemplary embodiment. Also, one or more components of the electronic apparatus 100 in FIG. 4 may be omitted according to an exemplary embodiment.

Since the communicator 110, the speaker 120, the microphone 130 and the processor 140 illustrated in FIG. 4 were explained above with reference to FIG. 3, further explanation thereof will be omitted.

The processor 140 may control hardware and/or software elements connected to the processor 140 by driving an operating system or an application program, and perform various data processes and calculations. In addition, the processor 140 may load the command or data received from at least one of the other elements to a volatile memory and process the loaded command or data, and store various data to a nonvolatile memory.

For this, by executing one or more software program stored in a private processor (e.g., an embedded processor) for performing the corresponding operations or in a memory device, the processer 140 may be implemented in a generic-purpose processor (e.g., a CPU or an application processor) which may perform the corresponding operations.

The memory 150 may store the command or data received from the processor 140 or from the other elements (e.g., the communicator 110, the speaker 120, the microphone 130 and the like) or generated by the processor 140 or by the other elements.

In addition, the memory 150 may comprise for example, programming modules such as a kernel, a middleware, an application programming interface (API) or an application. Each of the programming modules may be composed of software, firmware, hardware, or a combination thereof.

Figure 5:
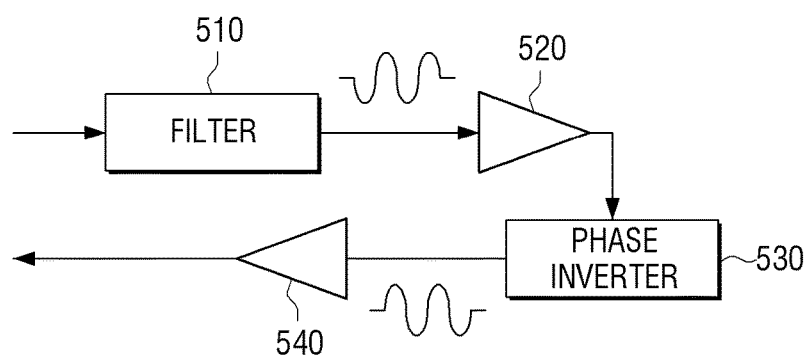
FIG. 5 is a view illustrating a noise canceling module according to an exemplary embodiment.

FIG. 5 is a view illustrating a noise canceling module according to an exemplary embodiment.

The electronic apparatus 100 may further comprise a noise canceling module for inverting the phase of the received sound. The noise canceling module may include the elements shown in FIG. 5, and the operation of the noise canceling module may be controlled by the processor 140. Specifically, if it is determined that the external electronic apparatus 200 is in an initial setting state or in a network setting state according to the state information of the external electronic apparatus 200 included in the BLE advertising packet, the processor 140 may drive the noise canceling module.

That is, if the sound output by the external electronic apparatus 200 is received through the microphone 120, the filter 510 may filter the received sound to remove a noise and output only the sound including the information used to communicate with the external electronic apparatus 200 (e.g., address information such as a BLE address) and/or authentication information (e.g., a Bluetooth SPP PIN).

Here, the processor 140 may obtain the information used in the communication with the external electronic apparatus 200 from the corresponding sound and use the obtained information in the communication with the external electronic apparatus 200 through the communicator 110.

Thereafter, a first amplifier 520 may amplify the sound output from the filter 510 and output the amplified sound to a phase inverter 530. The phase inverter 530 may invert the phase of the sound output from the first amplifier 520 and generate the sound having the inverted phase.

Thereafter, a second amplifier 540, which may be included in the speaker 130, may amplify the sound output from the phase inverter 530 and output the amplified sound.

FIG. 6 is a signal flow diagram illustrating a setting method according to an exemplary embodiment.

Referring to FIG. 6, the external electronic apparatus 200 performs an initial booting and performs an initial setting in the splash state through operations S611 to S616.

In operation S611, the external electronic apparatus 200 broadcasts the BLE advertising packet, which includes the state information indicating that the external electronic apparatus 200 is in the splash, state through the BLE communication method.

In operation S612, the external electronic apparatus 200 may output the sound including the BLE address of the external electronic apparatus 200. The external electronic apparatus 200 may output the BLE advertising packet and the sound concurrently. Also, the external electronic apparatus 200 may output the BLE advertising packet and/or the sound repeatedly (e.g., three times).

The electronic apparatus 100 may receive the BLE advertising packet broadcasted by the external electronic apparatus 200 and determine whether the external electronic apparatus 200 is in an initial setting state based on the state information included in the BLE advertising packet.

In operation S613, if it is determined that the external electronic apparatus 200 is in the initial setting state, the electronic apparatus 100 may activate the speaker 120 and the microphone 130. Accordingly, the electronic apparatus 100 may receive the sound output by the external electronic apparatus 200.

In operation S614, the electronic apparatus 100 may invert the phase of the receive sound and output the first inverted sound. Specifically, the electronic apparatus 100 may filter out the background sound from the received sound, generate the first inverted sound by inverting the phase of the remaining sound (i.e., the sound including the BLE address), and output the first inverted sound through the speaker 130.

Here, the electronic apparatus 100 may generate the first inverted sound right after the sound is received, and output the first inverted sound through the speaker 120 immediately.

In operation S615, the electronic apparatus 100 obtains the information regarding the BLE address of the external electronic apparatus 200 from the sound received in S612, and transmits information regarding the language setting of the electronic apparatus 100 according to the BLE communication method by using the BLE address, to the external electronic apparatus 200. The electronic apparatus 100 may transmit the device name of the electronic apparatus 100 to the external electronic apparatus 200.

In operation S616, the electronic apparatus 100 may deactivate the speaker 120 and the microphone 130.

As described above, during the initial setting stage, the external electronic apparatus 200 may set the language of the external electronic apparatus 200 as the same language as set in the electronic apparatus 100 based on the information about the language setting received from the electronic apparatus 100.

Thereafter, the external electronic apparatus 200 may enter the OOBE state and perform the network setting stage.

In operation S617, the external electronic apparatus 200 enters the OOBE state and broadcasts the BLE advertising packet through the BLE communication method, which includes the state information indicating that the external electronic apparatus 200 is in the OOBE state and address information of the external electronic apparatus 200 (e.g., Bluetooth MAC address and/or PSP MAC address).

In operation S618, the external electronic apparatus 200 outputs the sound including the SPP PIN for Bluetooth authentication between the electronic apparatus 100 and the external electronic apparatus 200. Here, the external electronic apparatus 200 may output the BLE advertising packet and the sound concurrently and repeatedly.

The electronic apparatus 100 receives the BLE advertising packet broadcasted by the external electronic apparatus 200 and determines whether the external electronic apparatus 200 is in the network setting state based on the state information of the external electronic apparatus 200 included in the BLE advertising packet.

In operation S619, if it is determined that the external electronic apparatus 200 is in the network setting state, the electronic apparatus 100 activates the speaker 120 and the microphone 130. Accordingly, the electronic apparatus 100 may receive the sound including the SPP PIN.

In operation S621, the electronic apparatus 100 may generate the second inverted sound by inverting the phase of the sound received in operation S618 from the external electronic apparatus 200, and output the second inverted sound.

Specifically, the electronic apparatus 100 may filter out the background sound (i.e., a noise) from the sound received from the external electronic apparatus 200, generate the second inverted sound by inverting the phase of the remaining sound (i.e., the sound including the SPP PIN), and output the second inverted sound through the speaker 130.

The electronic apparatus 100 may generate the second inverted sound right after the sound is received, and output the second inverted sound through the speaker 120 immediately.

In operation S622, the electronic apparatus 100 may form the communication link with the external electronic apparatus 200 according to the Bluetooth communication method based on the Bluetooth address information included in the BLE advertising packet received in operation S617 and the SPP PIN included in the sound received in operation S618.

In operation S623, after a communication link is established between the electronic apparatus 100 and the external electronic apparatus 200 according to the Bluetooth communication method, the electronic apparatus 100 transmits the information regarding a Wi-Fi access point and the user account information to the external electronic apparatus 200.

Accordingly, the external electronic apparatus 200 may connect to the same Wi-Fi access point to which the electronic apparatus 100 is connected. Also, the external electronic apparatus 200 may log in a web server using the user account stored in the electronic apparatus 100.

In S624, the electronic apparatus 100 may deactivate the speaker 120 and the microphone 130. The electronic apparatus 100 may deactivate the microphone 130 after receiving the sound output by the external electronic apparatus 200, and deactivate the speaker 120 after outputting the second inverted sound.

FIG. 7 is a flow chart illustrating the method for controlling the electronic apparatus to register the setting information with an external electronic apparatus, according to an exemplary embodiment.

In operation S710, the microphone is activated when the information which indicates that the external electronic apparatus 200 is in an initial setting state is received via the first wireless communication method.

In operation S720, the address information of the external electronic apparatus for a wireless communication with the external electronic apparatus 200 is obtained from the sound received from the microphone. Here, the address information of the external electronic apparatus 200 may be the address information of the external electronic apparatus according to the first wireless communication method.

In operation S730, the inverted sound in which the received sound is inverted is generated and output through the speaker.

By using the address information of the external electronic apparatus 200, the information regarding the language setting of the electronic apparatus 100 may be transmitted to the external electronic apparatus 200.

For example, the first wireless communication method may be the BLE communication method, and the address information of the external electronic apparatus 200 may include the BLE address. The information which indicates that the external electronic apparatus 200 is in an initial setting state may be transmitted to the electronic apparatus 100 through the BLE advertising packet.

If the information indicating that the external electronic apparatus 200 is in a network setting state and the address information of the external electronic apparatus 200, which is required for the second wireless communication method, is received via the first wireless communication method, the microphone of the electronic apparatus 100 may be activated. Thereafter, the authentication information for a wireless communication with the external electronic apparatus 200 may be obtained from the sound received through the microphone 130. In addition, the inverted sound in which the received sound is inverted is generated and output through the speaker 120.

Here, the authentication information may be the authentication information for a wireless communication according to the second wireless communication method.

By using the address information and the authentication information of the external electronic apparatus 200 according to the second wireless communication method, the communication link with the external electronic apparatus 200 according to the second wireless communication method may be formed.

Then, the information regarding the network to which the electronic apparatus 100 is connected to and the user account information of the electronic apparatus 100 may be transmitted to the external electronic apparatus 200.

The second wireless communication method may be the Bluetooth communication method. In this case, the address information of the external electronic apparatus according to the second wireless communication method may include the Bluetooth address of the external electronic apparatus 200, and the authentication information may include the Bluetooth SPP PIN. In addition, the information indicating that the external electronic apparatus 200 is in a network setting state and the address information of the external electronic apparatus 200 according to the second wireless communication method may be transmitted to the electronic apparatus 100 through the BLE advertising packet.

Exemplary embodiments for controlling the electronic apparatus 100 to perform a setting process of the external electronic apparatus 200 are described above.

A non-transitory computer readable medium in which a program sequentially performing the controlling method according to the exemplary embodiment is stored may be provided.

The non-transitory computer readable recording medium refers to a medium that stores data and that can be read by devices. For example, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like, but is not limited thereto.

In addition, communication between the respective components in the electronic apparatus may be performed through buses included in the electronic apparatus. Also, at least one of these components, elements or units may further comprise a processor such as a central processing unit (CPU) that performs the respective functions, a microprocessor, or the like.

According to the various exemplary embodiments, the electronic apparatus which receives communication connection information through sound from another electronic apparatus may output additional sound, so that the sound output from the other electronic apparatus is offset, thereby preventing a noise caused therefrom.

The foregoing example embodiments and advantages are merely examples and are not to be construed as limiting the example embodiments or the present disclosure. The present teaching can be readily applied to other types of devices. Also, the description of the example embodiments of the present disclosure is intended to be illustrative, and not to limit the scope of the claims.

What is claimed is:

1. An electronic apparatus comprising:
a speaker;
a microphone;
a communicator configured to communicate with an external electronic apparatus; and
a processor configured to:
activate the microphone in response to receiving information indicating that the external electronic apparatus is in an initial setting state through the communicator, the information being broadcasted by the external electronic apparatus via a first wireless communication method,
in response to receiving a sound output by the external electronic apparatus through the microphone, generate an inverted sound by inverting a phase of the received sound,
output the inverted sound through the speaker such that the sound output by the external electronic apparatus is offset by the inverted sound, and
obtain address information of the external electronic apparatus for wireless communication with the external electronic apparatus from the sound received through the microphone.

2. The electronic apparatus as claimed in claim 1, wherein the address information of the external electronic apparatus is address information of the external electronic apparatus according to the first wireless communication method.

3. The electronic apparatus as claimed in claim 1, wherein the processor is further configured to control the communicator to transmit information regarding language setting of the electronic apparatus to the external electronic apparatus by using the address information of the external electronic apparatus.

4. The electronic apparatus as claimed in claim 1, wherein the first wireless communication method is a Bluetooth Low Energy (BLE) communication method,
wherein the address information of the external electronic apparatus comprises a BLE Media Access Control (MAC) address, and
wherein the information indicating that the external electronic apparatus is in the initial setting state is transmitted to the electronic apparatus through a BLE advertising packet.

5. The electronic apparatus as claimed in claim 1, wherein the processor is further configured to:
in response to receiving, via the first wireless communication method, information indicating that the external electronic apparatus is in a network setting state and address information of the external electronic apparatus according to a second wireless communication method through the communicator, activate the microphone,
in response to receiving another sound from the external electronic apparatus through the microphone, generate another inverted sound by inverting a phase of the other sound received from the external electronic apparatus,
output the other inverted sound through the speaker such that the other sound received from the external electronic apparatus is offset by the other inverted sound, and
obtain authentication information, which is required for establishing a communication link with the external electronic apparatus according to a second wireless communication, from the other sound received from the external electronic apparatus.

6. The electronic apparatus as claimed in claim 5, wherein the second wireless communication method is a Bluetooth communication method.

7. The electronic apparatus as claimed in claim 5, wherein the processor is further configured to control the communicator to establish the communication link with the external electronic apparatus according to the second wireless communication method by using the authentication information and the address information of the external electronic apparatus according to the second wireless communication method.

8. The electronic apparatus as claimed in claim 7, wherein the processor is further configured to control the communicator to transmit information regarding a network to which the electronic apparatus is connected to and user account information of the electronic apparatus to the external electronic apparatus through the communication link.

9. The electronic apparatus as claimed in claim 5, wherein the second wireless communication method is a Bluetooth communication method,
wherein the address information of the external electronic apparatus according to the second wireless communication method comprises a Media Access Control (MAC) address,
wherein the authentication information comprises a Bluetooth Serial Port Protocol (SPP) personal identification number (PIN), and
wherein the processor is further configured to receive the information indicating that the external electronic apparatus is in the network setting state and the address information of the external electronic apparatus according to the second wireless communication method through a BLE advertising packet.

10. A method for controlling an electronic apparatus to register setting information with an external electronic apparatus, the method comprising:
activating a microphone of the electronic device in response to receiving information indicating that the external electronic apparatus is in an initial setting state via a first wireless communication method;
in response to receiving a sound output by the external electronic apparatus through the microphone, generating an inverted sound by inverting a phase of the received sound;
outputting the inverted sound through a speaker of the electronic device such that the sound output by the external electronic apparatus is offset by the inverted sound; and
obtaining address information of the external electronic apparatus for wireless communication with the external electronic apparatus from the received sound.

11. The method as claimed in claim 10, wherein the address information of the external electronic apparatus is address information of the external electronic apparatus according to the first wireless communication method.

12. The method as claimed in claim 10, further comprising:
    transmitting information regarding language setting of the electronic apparatus to the external electronic apparatus by using the address information of the external electronic apparatus.

13. The method as claimed in claim 10, wherein the first wireless communication method is a Bluetooth Low Energy (BLE) communication method,
    wherein the address information of the external electronic apparatus comprises a BLE Media Access Control (MAC) address, and
    wherein the information indicating that the external electronic apparatus is in the initial setting state is transmitted to the electronic apparatus through a BLE advertising packet.

14. The method as claimed in claim 10, further comprising:
    activating the microphone in response to receiving, through the first wireless communication method, information indicating that the external electronic apparatus is in a network setting state and the address information of the external electronic apparatus according to a second wireless communication method;
    in response to receiving another sound from the external electronic apparatus through the microphone, generating another inverted sound by inverting a phase of the other sound received from the external electronic apparatus;
    outputting the other inverted sound through the speaker such that the other sound received from the external electronic apparatus is offset by the other inverted sound; and
    obtaining authentication information, which is required for establishing a communication link with the external electronic apparatus according to a second wireless communication, from the other sound received from the external electronic apparatus.

15. The method as claimed in claim 14, wherein the second wireless communication method is a Bluetooth communication method.

16. The method as claimed in claim 14, further comprising establishing the communication link with the external electronic apparatus according to the second wireless communication method by using the authentication information and the address information of the external electronic apparatus according to the second wireless communication method.

17. The method as claimed in claim 16, further comprising transmitting information regarding a network to which the electronic apparatus is connected to and user account information of the electronic apparatus to the external electronic apparatus through the communication link.

18. The method as claimed in claim 14, wherein the second wireless communication method is a Bluetooth communication method,
    wherein the address information of the external electronic apparatus according to the second wireless communication method comprises a Media Access Control (MAC) address,
    wherein the authentication information comprises a Bluetooth Serial Port Protocol (SPP) personal identification number (PIN), and
    wherein the information indicating that the external electronic apparatus is in the network setting state and the address information of the external electronic apparatus according to the second wireless communication method are transmitted to the electronic apparatus through a BLE advertising packet.

19. The electronic apparatus as claimed in claim 8, wherein the information regarding the network to which the electronic apparatus is connected to comprises identification information and address information of a Wi-Fi Access Point.

20. The electronic apparatus as claimed in claim 8, wherein the processor is further configured to deactivate the speaker and the microphone after transmitting the information regarding the network and the user account information to the external electronic apparatus.

* * * * *